July 22, 1969  W. MENZEL  3,456,577
APPARATUS FOR PREPARING FOODS OR DELICACIES WITH
ADDED AIR, PARTICULARLY SOFT ICE FREEZER
Filed July 26, 1967  2 Sheets-Sheet 1

Inventor:
WALDEMAR MENZEL
BY Robert K Jacob
AGT.

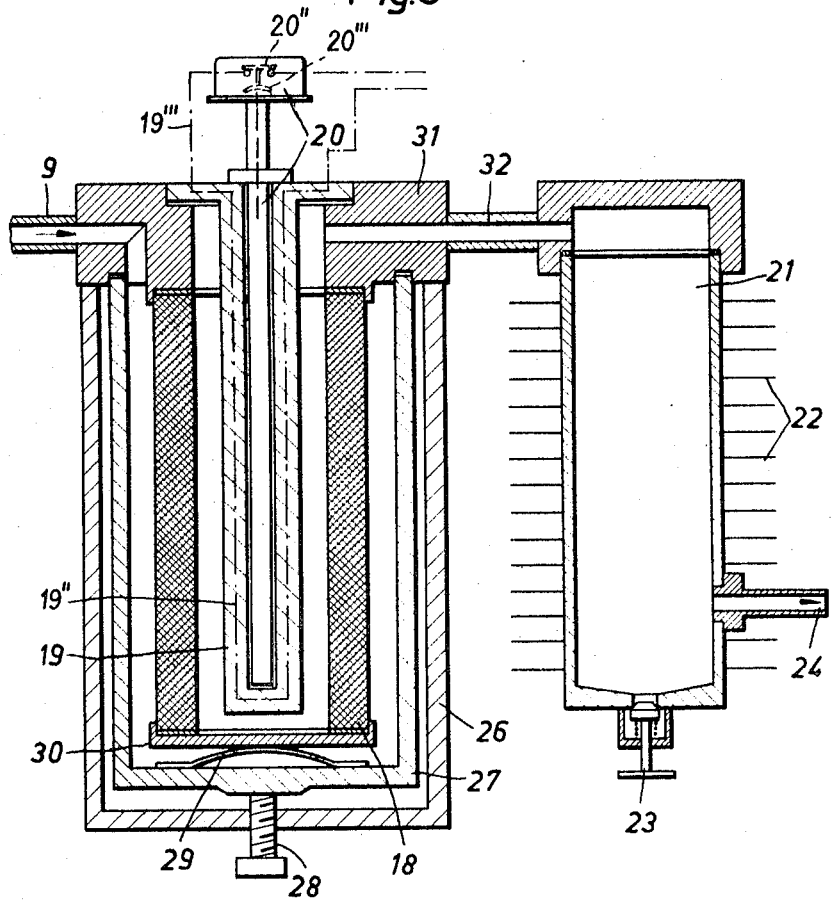

3,456,577
APPARATUS FOR PREPARING FOODS OR DELICACIES WITH ADDED AIR, PARTICULARLY SOFT ICE FREEZER
Waldemar Menzel, Burghaig uber Kulmbach, Germany, assignor to Firma Lumen G.m.b.H. Nahrmittel- und Maschinenfabrik, Kulmbach, Germany
Filed July 26, 1967, Ser. No. 656,236
Claims priority, application Germany, July 26, 1966, G 47,526
Int. Cl. A23l 3/00
U.S. Cl. 99—249                                 10 Claims

ABSTRACT OF THE DISCLOSURE

Sterilizing means for the air in a food ice freezer, where a sterilizing or degerminating filter which includes a heater for the air and a dehumidifier with cooling ribs is connected in the compressed air supply line.

BACKGROUND OF THE INVENTION

The invention relates to apparatus for preparing foods or delicacies having air admixed thereto, and is particularly concerned with means for introducing air to the system for addition to the mix and for sterilizing such air to meet health law requirements.

Different methods for preparing foods or delicacies are known where air is admixed to a basic substance or mix, which usually is of liquid or mushy consistency. The present day hygienic discoveries have resulted in ever increasing requirements as far as sterilization is concerned. It is therefore conventional to conduct the air which is to be introduced in the basic substance through special filters, particularly bacteria filters. The invention is based on the discovery that filters of this type do not fully preclude the entrance of germs.

Experience has shown that, depending on the total amount and on the condition of air passed through them, fine filters which are in continuous operation require, after having been used for one to eight days, that their filter inserts be exchanged against new sterilized ones and that the used inserts be sterilized or freed of germs. If the exchange is not undertaken at the right time, then there exists the danger that so many germs enter into the filtered air in a short time that the end product, for example food ice, has a germ content which is so great that it exceeds the requirements of the food laws.

The exchanging and sterilizing of the filter inserts at short time intervals is cumbersome, and particularly in smaller installations, such as, for example, soft ice freezers, it is not economical because it requires a special sterilizing installation such as a hot steam apparatus for heating the filter inserts to 120–130° C., which is too expensive in such form.

In accordance with the invention these problems are overcome by relatively simple means.

In accordance with the invention several heating devices are provided in food ice freezers in the path of the air supply which raise the air passing through or the devices through which the air passes to the sterilizing temperature. While the heating devices may be of any desired type, they are suitably equipped with electric heating elements.

Proposals have already been made to equip the freezing vessel or the supply container of soft ice freezers with a pasteurizing heater. In this manner the ice mix contained in the freezer is degerminated or sterilized. However, this proposal did not provide for any particular heat sterilizing in the path of the compressed air that is to be supplied to the ice mix. The heating arrangements in accordance with the present invention for the compressed air to be blown in or for the components through which it passes may additionally be provided with heating devices for the pasteurization of the ice mix.

BRIEF DESCRIPTION OF THE DRAWINGS

Further advantages and features of the invention will become apparent from the following description of an embodiment of the invention in soft ice freezers illustrated in the accompanying drawings, which represent a preferred field of application of the invention, and in which FIG. 3 shows a filter with an electric heating element in section and a dehumidifier with cooling ribs connected in series therewith, and drawn to a larger scale.

DESCRIPTION OF THE INVENTION

Figure 1:
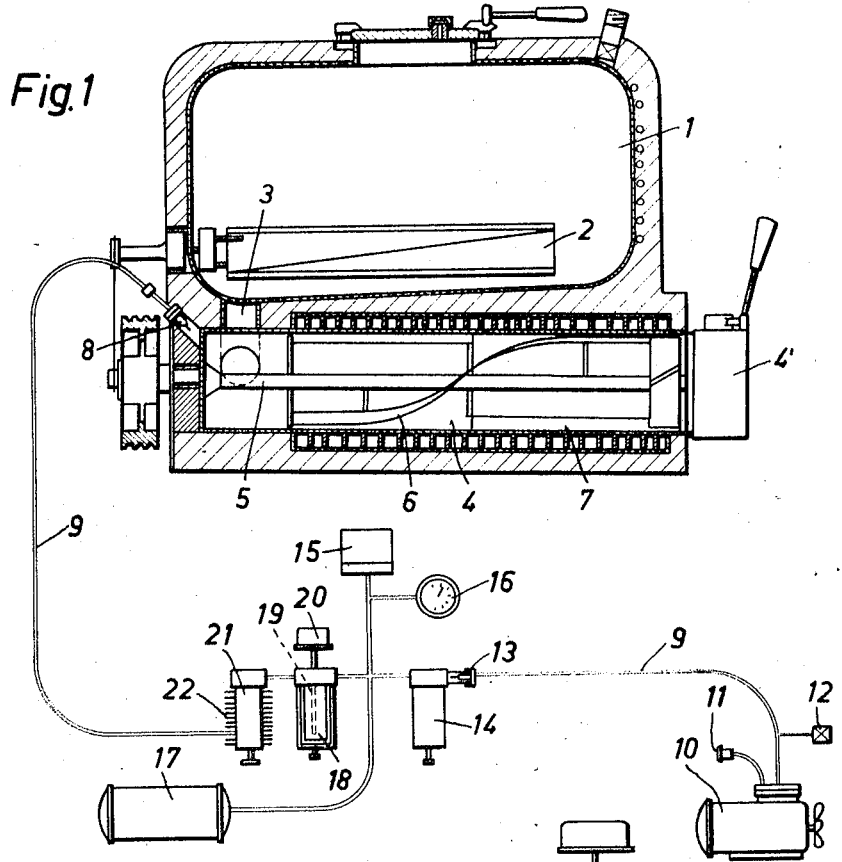
FIG. 1 is a longitudinal section through a soft ice freezer which is adapted to dispense soft ice in portions and includes the required accessories, but not the refrigerating machine.

The soft ice freezer comprises a supply container 1 which receives the ice mix and, if desired, serves also for preparing the ice mix out of its initial components. This container is provided with a stirrer 2 connected by means of a relatively large supply tube 3 to the freezing vessel 4. In this vessel a stirring blade 6 is located which is driven by means of a shaft 5 and includes also a scraper 7 which sweeps over the wall of the vessel. An air supply conduit 9 leads into the freezing vessel 4 by way of a check valve 8 and supplies the vessel 4, and by way of the supply tube 3 also the supply container 1, with air under slightly excess pressure, so that the air space of both containers 1 and 4 is under excess pressure. The air absorbed by the ice mix in the freezing kettle 4 constitutes the air increment which causes the product to be fluffy and palatable. A discharge device 4′ permits the withdrawal of the finished product in portions.

An air compressor 10 which draws the outer air in by way of an entrance filter 11 and forces it into the conduit 9 may serve as the source of compressed air. A pressure limiting device, for example, an excess pressure valve which controls the discharge pressure of the compressor 10, prevents inadmissible pressure increases. The compressed air flows through a check valve 13 into a pre-filter 14 and from there to a fine filter 18 that has been raised to the sterilizing temperature by means of the heating element 19, which is provided with a temperature sensor having a switch 20 which serves for checking and controlling the temperature. The temperature sensor maintains the temperature at the level required for the sterilization. Between the devices 14 and 18 are connected on the one side a pressure control 15 which controls the electric circuit of the driving motor (not illustrated) and a manometer 16, and on the other side a compressed air container 17. The heated fine filter 18 is followed by a dehumidifier 21. The latter is provided with cooling ribs 22 or other cooling means, in order to cool the heated air coming from the heating device 19 at least partly before it flows to the check valve 8 (FIG. 1). An adjustable outlet 23 serves in a conventional manner for removing separated humidity.

The connection of the heating device 19 with the filter 18 has the advantage that the filter insert can be sterilized during pauses in operation, for example daily after closing time. The filter heater may, however, be continuously turned on when air is drawn in by suction or force through the filter. Suitably the capacity of the heater is such that the filter insert is heated to about 150° C.

Figure 2:
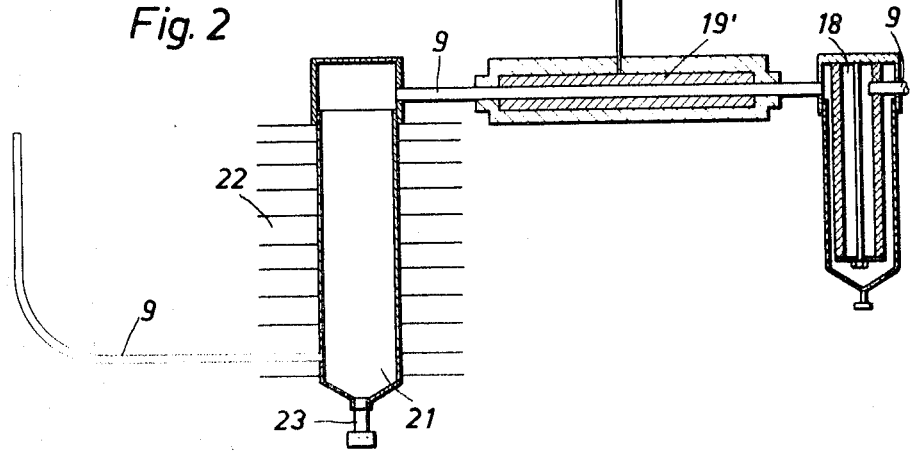
FIG. 2 shows in section a somewhat modified part of the air supply line with several devices connected therein which serve for sterilization.

The heating device or heating devices may also be introduced in other locations of the path of the air, but the heating of the filter or filters is most effective. In accordance with FIG. 2 the heating device 19' which is protected by the temperature sensor 20' directly encompasses the compressed air conduit 9 by means of the tubular heating element of sufficient length to impart the required temperature to the passing air. The heating device 19' is located here between the fine filter 18 and the series connected dehumidifier 21.

It is also possible to dispense with the pre-cooling in the device 21 and to provide a sterilizing heater directly at the entrance valve 8. It is also possible to provide several heating devices simultaneously at different locations in the path of the air flow.

The filter illustrated in FIG. 3 is enclosed in an outer housing 26 which is fastened to a head member 31 that contains the air supply and the air discharge duct. An inner filter housing 27 is pressed tight with its upper border against the head portion 31 by means of a pressure screw 28 that is threadedly received in the bottom of the outer housing 26. A leaf spring 29 which rests on the bottom of the inner housing 27 supports bottom plate 30 from below, which in turn carries the hollow cylindrical filter insert 18, which may, for example, be made of ceramic material. The filter insert rests with its upper end also tightly against the head portion 31. The electric heating element 19 is only indicated in outline. It can consist of a tubular ceramic support having heating wires embedded therein. It is suspended by means of a flange on the head portion 31 and extends deeply into the filter insert 18. The temperature sensor 20 in the form of a rod extends into the longitudinal bore of the heating element and carries at its upper end the associated contact device. The latter disconnects the current at the temperature at which the sensor responds. The cleaned air that is discharged from the filter is fed through a connecting tube 32 to the dehumidifier 21, the housing of which is provided with cooling ribs 22. A bottom connection 23 permits the discharge of cooled moisture condensate. The outlet stub 24 of the dehumidifier is connected to the continuation of the conduit 9, as shown in FIG. 1. The embodiment of the filter illustrated is independent of whether the air is pressed through the filter or drawn through by suction.

The temperature sensor 20 which is illustrated by way of example in FIG. 3 is an element that is known in many different forms. For example, the sensor in accordance with FIG. 3 is assumed to be contained in the vertical tube of element 20 and in the form of a heat expansible liquid column which acts on a switch 20" when the temperature to which it is responsive is reached. Suitably this contact is associated with a snap spring 20''' which is adapted to suddenly change its shape. At the limit temperature for which it is provided the contact points 20" may be opened, and as a result the circuit 19''' of the heat conduit 19" which is embedded in the heating element 19 is interrupted.

Having now described my invention I do not wish to be limited thereto but what I desire to protect by Letters Patent of the United States is set forth in the appended claims.

I claim:
1. Apparatus for preparing foods or delicacies from a basic mass in generlly liquid form having air admixed thereto comprising at least a vessel in which the basic mass is treated, air duct means for supplying air to said vessel, and sterilizing means including at least one filter and a heating device arranged in the path of said air duct means for raising the air passing therethrough to degerminating temperature.

2. Apparatus in accordance with claim 1, including a source of compressed air and an entrance valve in said vessel for supplying said vessel with air under pressure connected to said air duct means.

3. Apparatus in accordance with claim 2, including said air filter arranged in the path of said air duct means and said heating device being built into said filter for sterilizing the filter surfaces.

4. Apparatus in accordance with claim 3, including air cooling means arranged in the path of said duct means in sequence after said at least one heating device.

5. Apparatus in accordance with claim 3, where said air filter is provided with a longitudinally extending generally cylindrical filter insert, said heating device being an electrical element extending centrally of said insert and of a capacity to raise said insert to sterilization temperature.

6. Apparatus in accordance with claim 5, including a temperature sensor extending centrally of and into said heating device and having a switch connected thereto, said sensor being responsive to disconnect said heating device when the sterilizing temperature is reached.

7. Apparatus in accordance with claim 1, where said air duct means is a conduit and said heating device is a tubular element disposed around said conduit.

8. Apparatus in accordance with claim 7, including an air filter and a dehumidifier connected in series to said conduit and where said heating device is disposed around said conduit between said filter and said dehumidifier.

9. Apparatus in accordance with claim 8, including air cooling means arranged in the path of said duct means in sequence after said at least one heating device.

10. Apparatus in accordance with claim 9, where said cooling means is in the form of cooling ribs or the like arranged on said dehumidifier.

References Cited

UNITED STATES PATENTS 2,132,364  10/1938  Thompson _____ 259—109

FOREIGN PATENTS 494,801  11/1927  Germany.

ROBERT W. JENKINS, Primary Examiner